United States Patent [19]

Ross

[11] 4,159,394
[45] Jun. 26, 1979

[54] WOVEN CUT-LINE CABLE AND METHOD
[75] Inventor: Edgar A. Ross, Greenville, S.C.
[73] Assignee: Southern Weaving Company, Greenville, S.C.
[21] Appl. No.: 811,727
[22] Filed: Jun. 30, 1977
[51] Int. Cl.² ............................................. H01B 7/08
[52] U.S. Cl. .......................... 174/72 TR; 174/117 F; 174/72 A; 174/117 M; 139/407
[58] Field of Search ........... 174/72 A, 72 TR, 117 M, 174/117 F; 139/425 R, 407

[56] References Cited
U.S. PATENT DOCUMENTS

| | | | |
|---|---|---|---|
| 2,292,322 | 8/1942 | Huizeng | 139/407 |
| 2,380,939 | 8/1945 | Campbell | 139/407 |
| 2,433,239 | 12/1947 | Rasero | 174/117 M |
| 3,646,247 | 2/1972 | Sennett et al. | 174/117 M |

Primary Examiner—R. N. Envall, Jr.
Attorney, Agent, or Firm—Bailey, Dority & Flint

[57] ABSTRACT

A woven multiconductor cable and method of making the same includes at least two longitudinal sections arranged in a side-by-side manner having a plurality of elongated conductors and a cut-line formed between the sections along which the filling strand of the woven cable may be cut along a desired length of the cable to separate the cable into individual sections which remain bound by alternate picks of the filling strand.

3 Claims, 5 Drawing Figures

WOVEN CUT-LINE CABLE AND METHOD

BACKGROUND OF THE INVENTION

In making field installation of woven cables of the type having a plurality of elongated conductors which are bound by mutually interwoven filling and warp strands, it often becomes necessary to separate out certain of the conductors so that terminal connection may be made at certain terminal locations and so that different routing directions can be made. While it has been known to manufacture woven cables with different groups of conductors branches from a main truck section, it has not been practical to modify the arrangement of conductors when application is being made in the field.

U.S. Pat. No. 3,627,903 discloses a method of separating conductor wire groups into branch outs by heat fusing the thermoplastic fill and warp filaments and the thermoplastic jacket of the conductor wires. However, such requires passing a heated knife between conductors which is not always a practical operation.

SUMMARY OF THE INVENTION

It has been found that a woven multiconductor cable can be provided having a longitudinal cut-line along which the filling strand can be severed along a desired length of the cable to produce a bound section of conductors on either side of the cut-line. The cable includes at least two longitudinally extending sections arranged in a side-by-side manner with a plurality of longitudinal conductors in each section. A single continuous filling strand is woven about the cable and includes a plurality of main picks woven across the entire width of the cable. A plurality of shortened picks of the filling strand is woven across one of the sections and another plurality of shortened picks of the filling strand is woven across the other of the sections in the cable. A cut-line is defined between the sections along which the main picks may be severed so that the sections may be separated and remain individually bound by the filling strand of the shortened picks. In a preferred embodiment the main picks and the shortened picks alternate along the length of cable and a plurality of warp strands are interwoven with the filling strand between adjacent conductors.

Accordingly, an important object of the present invention is to provide a woven multiconductor cable having a cut-line along which the cable may be cut lengthwise to produce separated sections of conductors which remain bound.

Another important object of the present invention is to provide a woven multiconductor cable and a method therefor having a plurality of longitudinal sections with a cut-line formed therebetween which may be cut during installation to provide separated individually bound branches of conductors.

Yet another important object of the present invention is to provide a woven multiconductor cable which may be utilized as a single cable with all of the conductors bound or may be separated into a plurality of sections in which the separated conductors remain bound by simply cutting along a predetermined cut-line in the cable.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 5 is a sectional view taken along line 5—5 of FIG. 1.

DESCRIPTION OF A PREFERRED EMBODIMENT

The invention relates to woven cables having a plurality of conductors which are placed in a generally side-by-side manner and bound together by the weaving of a fill strand and a plurality of warp strands. The invention is particularly advantageous for the type of woven cables having a generally flat configuration.

Figure 1:
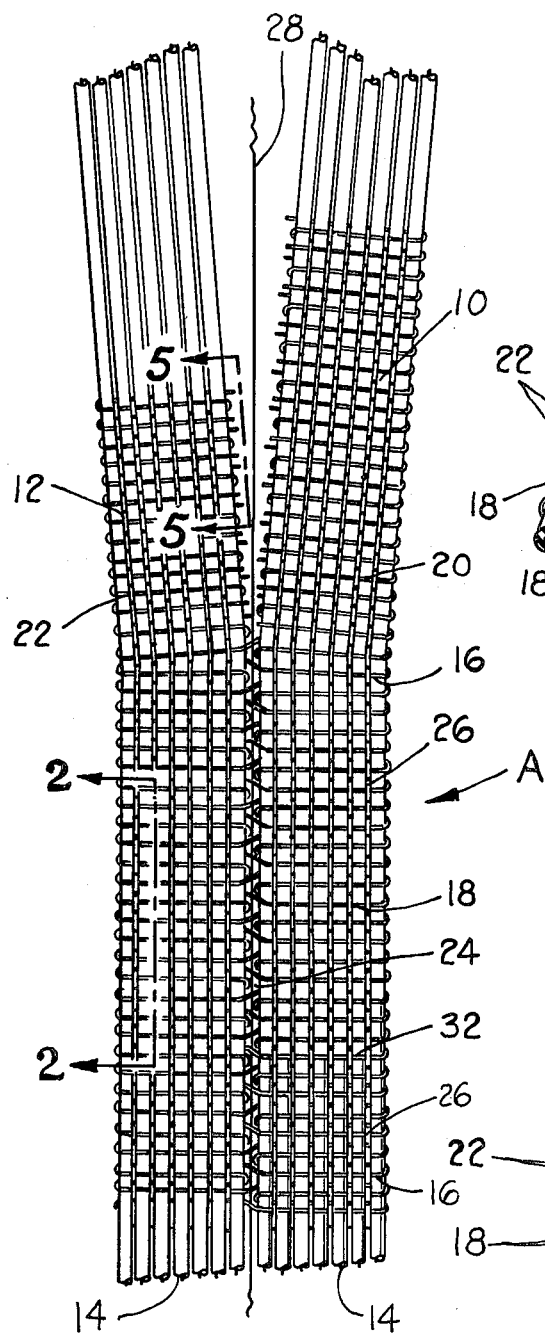
FIG. 1 top plan view of a woven multiconductor cable having a cut-line constructed in accordance with the present invention.
Figure 2:
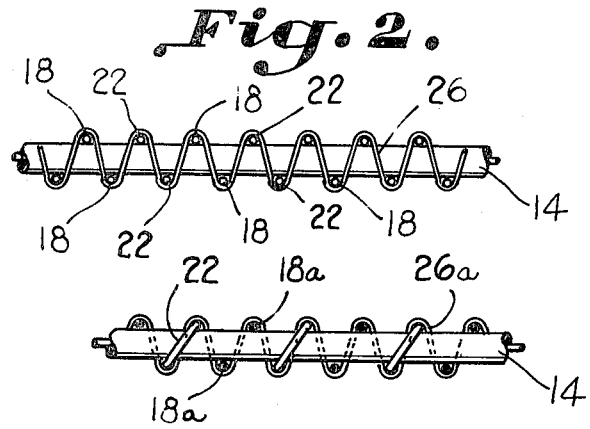
FIG. 2 is a sectional view taken along line 2—2 of FIG. 1.

As illustrated in FIG. 1 a woven multiconductor cable, designated generally as A, includes two longitudinally extending sections 10 and 12 arranged in a side-by-side manner. Each section includes a plurality of elongated conductors 14 which normally comprise a conductor wire of a desired gauge surrounded by an insulated jacket.

It will be noted that a single continuous filling strand 16 is woven about the cable in a predetermined manner. A plurality of main picks 18 of the filling strand 16 are woven to and fro across the entire width of the cable A. A plurality of shortened picks 20 of the fill strand are woven to and fro across the section 10 only excluding the section 12. A plurality of shortened picks 22 of the filling strand 16 are woven to and fro across the section 12 excluding the section 10. In this manner, a cut-line 24 is defined and provided between the sections 10 and 12 along which the main picks 18 may be severed along a desired length of the cable so that the sections 10 and 12 are separated but remain individually bound by the shortened picks 20 and 22, respectively. It being understood, of course, that the cable A may be constructed having any number of sections containing any number of conductors in accordance with the present invention with a cut-line delineated between adjacent sections. However, for the purposes of illustration, only two such sections have been shown and illustrated. It will be noted that the cable A need not be cut in use but may also be used as a single cable in which the sections remain bound together as a single cable.

Figure 3:
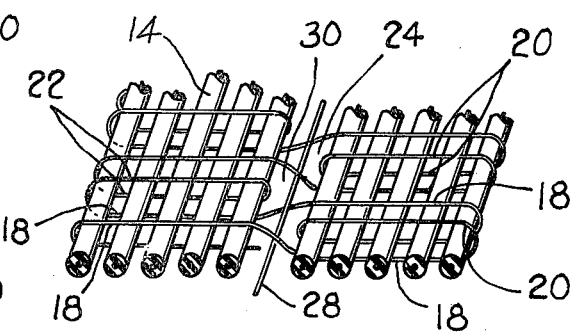
FIG. 3 is a partially cut-away view showing schematically the weave pattern of a filling strand woven in accordance with the present invention.
Figure 4:
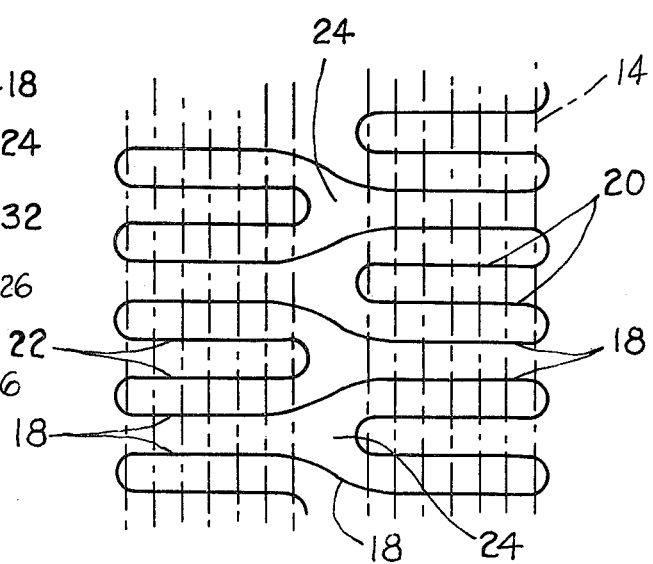
FIG. 4 is a schematic illustration of a woven multiconductor cable having a plurality of sections and a cut-line constructed in accordance with the present invention.

A plurality of warp strands 26 are interwoven with the filling strand 16 as it is picked to and fro across the cable and the individual sections in the main and shortened picks by holding the warps in a harness and programming the heddles in a conventional manner on a loom. In FIGS. 3 and 4, the warp strands are omitted for the sake of clarity. As illustrated, the main picks 18 alternate with the short picks 20 and 22 along the length of the cable so that in weaving, a continuous pick 18 is followed by a shortened pick 20 followed by a continuous pick 18 which is then followed by a short pick 22. This pattern is then repeated along the entire length of the cable. By weaving the main and short picks alternately, uniform binding of the individual sections is provided no matter to which point the cut-line 24 is severed.

A warp strand 28 having a distinctive color which readily distinguishes it from the warp strands 26 and conductors 14 is woven along the cut-line 24 to delineate the line and make it readily visible for cutting. The warp strand 28 is preferably woven through the openings 30 defined by the passing of adjacent main picks 18 over and underneath the adjacent sections 10 and 12.

FIG. 5 illustrates the manner in which the cut edge of each section remains bound. The severed ends 18a of the main picks 18 are tightly bound by the warp strand 26a next adjacent the cut-line as well as the warp strands intermediate the outermost conductors of each section. It is virtually impossible for the cut loops of the main picks 18 to pull out under normal use after the cut-line is severed. The loops of the main picks 18 thus formed and bound act as continuous loops about each section. The shortened picks of fill strand woven about each section encompass the section around the entire periphery thereof before terminating in the severed ends 18a of the main picks adjacent the short picks. Thus, each separated section remains bound in generally the same degree as the conductors in the main trunk portion 32 of the cable in which the cut-line is not severed.

It can be seen that a highly advantageous and practical woven multiconductor cable can be had in accordance with the present invention wherein the cables may be utilized as a single cable or may be separated into different branches in which the conductors remain bound by simply cutting along a predetermined cut-line in the cable.

While a preferred embodiment of the invention has been described using specific terms, such description is for illustrative purposes only, and it is to be understood that changes and variations may be made without departing from the spirit or scope of the following claims.

What is claimed is:

1. A woven multiconductor electrical cable comprising:
   at least two longitudinally extending sections arranged in a side-by-side manner;
   a plurality of elongated electrical conductors extending longitudinally in the warp direction in each said section in a generally straight side-by-side manner, each said conductor including a wire core surrounded by insulation;
   a single continuous filling strand woven to and fro across the top and bottom of said conductors in alternate spaced top and bottom picks;
   a plurality of warp strands woven over and under said top and bottom picks of said filling strand between adjacent conductors;
   a plurality of main picks of said filling strand woven across the entire width of said cable sections;
   a plurality of shortened picks of said filling strand woven across only one of said sections;
   a plurality of shortened picks of said filling strand woven across the other of said sections;
   a cut-line web defined between adjacent sections;
   each said section having an edge conductor extending generally straight longitudinally along the inner edge of said section adjacent said cut-line web, said edge conductor being looped completely by said shorter picks of said filling strand;
   a cut-line defined in said cut-line web between adjacent sections along which said main picks may be severed along a desired length with said edge conductors being maintained in each section by said looped shortened picks; and
   said severed ends of said main picks being bound and prevented from unravelling by said warp strand being interwoven with said main picks between said edge conductor and the next adjacent conductor in each said section;
   whereby said cable may be separately cut into separately bound sections for forming a branched cable or separated cables as desired.

2. The multiconductor cable of claim 1 including a warp strand of distinctive color woven along said cut-line to delineate said line.

3. A method of constructing a woven multiconductor cable having a cut-line along which the cable may be cut lengthwise to separate the cable into individually bound sections comprising the steps of:
   providing a number of longitudinally extending conductors arranged in a generally straight side-by-side manner in said cable;
   providing a filling strand;
   weaving a number of main picks of said filling strand to and fro across the tops and bottoms all of said conductors in alternate spaced top and bottom picks;
   weaving a number of shortened picks of said filling strand exclusively to and fro across certain ones of said conductors to define a first section of conductors;
   weaving a number of shortened picks of said filling strand exclusively to and fro across certain other ones of said conductors to define a second section of conductors;
   weaving a plurality of warp strands alternately over and under said top and bottom picks of said filling strand between adjacent conductors; and
   said cut-line being provided between said first and second sections so that severance of said main picks leaves the separated sections generally bound by said filling strand woven by said shortened picks with the severed ends of said main picks being generally bound by said warp strand woven between an edge conductor next to said cut line and a next adjacent conductor in each said section.

* * * * *